(12) United States Patent
Aoki et al.

(10) Patent No.: US 11,389,806 B2
(45) Date of Patent: Jul. 19, 2022

(54) CENTRIFUGAL FIELD-FLOW FRACTIONATION DEVICE

(71) Applicant: SHIMADZU CORPORATION, Kyoto (JP)

(72) Inventors: Kengo Aoki, Kyoto (JP); Haruhisa Kato, Tsukuba (JP)

(73) Assignee: SHIMADZU CORPORATION, Kyoto (JP)

( * ) Notice: Subject to any disclaimer, the term of this patent is extended or adjusted under 35 U.S.C. 154(b) by 413 days.

(21) Appl. No.: 16/471,878

(22) PCT Filed: Dec. 22, 2016

(86) PCT No.: PCT/JP2016/088334
§ 371 (c)(1),
(2) Date: Aug. 23, 2019

(87) PCT Pub. No.: WO2018/116439
PCT Pub. Date: Jun. 28, 2018

(65) Prior Publication Data
US 2020/0122158 A1   Apr. 23, 2020

(51) Int. Cl.
*B03B 5/28* (2006.01)
*B04B 1/02* (2006.01)
(Continued)

(52) U.S. Cl.
CPC .............. *B03B 5/28* (2013.01); *B04B 1/02* (2013.01); *B01D 21/262* (2013.01); *B04B 11/02* (2013.01);
(Continued)

(58) Field of Classification Search
CPC .......... B04B 1/02; B04B 11/02; B04B 13/00; B04B 2005/045; B04B 5/0442;
(Continued)

(56) References Cited

U.S. PATENT DOCUMENTS

| | | | |
|---|---|---|---|
| 4,448,679 A | 5/1984 | Dilk, Jr. et al. | |
| 4,743,227 A * | 5/1988 | Takeuchi | B04B 5/0407 494/45 |

(Continued)

FOREIGN PATENT DOCUMENTS

| | | |
|---|---|---|
| EP | 2 524 732 A1 | 11/2012 |
| EP | 2 524 733 A1 | 11/2012 |

(Continued)

OTHER PUBLICATIONS

"CF2000 Centrifugal FFF—Particle Separator", POSTNOVA, 2 pages.

(Continued)

*Primary Examiner* — Walter D. Griffin
*Assistant Examiner* — Shuyi S. Liu
(74) *Attorney, Agent, or Firm* — Sughrue Mion, PLLC

(57) ABSTRACT

Provided is a centrifugal field-flow fractionation device in which a liquid sample is less likely to leak from a channel and attachment and detachment work of a channel member is facilitated. By integrally forming an outer peripheral surface 162 and an inner peripheral surface 163 of a channel member 16, the channel member 16 is configured as one hollow member having a channel 161 formed inside. Thus, pressure resistance performance of the channel member 16 is improved, formation of a gap in the channel 161 can be prevented, and deterioration in sealing performance due to secular change is not generated. Accordingly, a liquid sample is less likely to leak from the channel 161. Further, since the channel member 16 can be handled as one member, attachment and detachment work of the channel member 16 is facilitated.

6 Claims, 10 Drawing Sheets

(51) Int. Cl.
  *B01D 21/26* (2006.01)
  *B04B 11/02* (2006.01)
  *B04B 11/06* (2006.01)
  *B04B 15/00* (2006.01)
  *B29B 17/02* (2006.01)

(52) U.S. Cl.
  CPC ............... *B04B 11/06* (2013.01); *B04B 15/00* (2013.01); *B29B 2017/0244* (2013.01)

(58) Field of Classification Search
  CPC .......... B03B 5/34; G01N 1/10; G01N 15/042; G01N 2030/002; G01N 30/0005; G01N 15/02
  USPC .......................................................... 494/23
  See application file for complete search history.

(56) References Cited

U.S. PATENT DOCUMENTS

| | | | |
|---|---|---|---|
| 7,442,315 B2 | 10/2008 | Cardot et al. | |
| 2004/0000519 A1* | 1/2004 | Jiang | G01N 30/0005 210/634 |
| 2012/0234731 A1* | 9/2012 | Senftleber | G01N 30/0005 209/39 |
| 2014/0066280 A1 | 3/2014 | Welz | |
| 2015/0314287 A1* | 11/2015 | Igata | B01L 3/502707 73/150 A |
| 2017/0284975 A1* | 10/2017 | Zhong | G01N 30/00 |

FOREIGN PATENT DOCUMENTS

| | | |
|---|---|---|
| EP | 2 524 734 A1 | 11/2012 |
| EP | 2 524 735 A1 | 11/2012 |
| JP | 62-298466 A | 12/1987 |
| JP | 63-86860 U | 6/1988 |
| JP | 5-33849 U | 5/1993 |
| JP | 2014-518761 A | 8/2014 |
| JP | 2015-210242 A | 11/2015 |
| JP | 2016-47497 A | 4/2016 |
| JP | 2016-128835 A | 7/2016 |

OTHER PUBLICATIONS

Written Opinion for PCT/JP2016/088334 dated Apr. 4, 2017 [PCT/ISA/237].

International Search Report for PCT/JP2016/088334 dated Apr. 4, 2017 [PCT/ISA/210].

* cited by examiner

CENTRIFUGAL FIELD-FLOW FRACTIONATION DEVICE

TECHNICAL FIELD

The present invention relates to a centrifugal field-flow fractionation device that allows a liquid sample to flow into a channel provided along an inner peripheral surface of an annular rotor and rotates the rotor to classify particles in the liquid sample in the channel by a centrifugal force.

BACKGROUND ART

Field-flow fractionation is known as a method of classifying particles contained in a liquid sample according to specific gravity. For example, Patent Document 1 below discloses an example of a centrifugal field-flow fractionation device that allows a liquid sample to flow into a channel and rotates the channel to classify particles in the liquid sample by a centrifugal force.

The centrifugal field-flow fractionation device includes, for example, a rotor, a channel member, a fixing member, and the like. The rotor is formed in an annular shape, and is rotatably held about a rotation axis. The channel member has, for example, a three-layer structure, and layers are sequentially stacked in a state where each layer is curved in an arc shape along an inner peripheral surface of the rotor. The fixing member is a C-shaped member extending in an arc shape along an inner peripheral surface (a layer closest to the rotation axis) of the channel member.

Each of the layers constituting the channel member has an elongated shape, and includes an intermediate layer (see FIG. 5 of Patent Document 1) on which an opening extending in a longitudinal direction is formed, and an outer surface layer and an inner surface layer (see FIGS. 4(a) and 4(b) of Patent Document 1) sandwiching the intermediate layer to form a channel between an outer side and an inner side of the opening by closing the outer and inner sides. On the inner surface layer, an inlet and an outlet including a through-hole communicating with the channel are formed. A liquid sample is allowed to flow into the channel through the inlet, and to flow out of the channel through the outlet.

The layers of the channel member as described above are stacked in a state curved along an outer peripheral surface of the fixing member, and attached to the fixing member using a bolt or a pin. The fixing member to which the channel member is attached is inserted into space inside the rotor, and is fixed along an inner peripheral surface of the rotor so as to sandwich the channel member with the rotor. At this time, with a wedge-shaped member attached between both ends of the C-shaped fixing member, a force is applied in a direction in which the ends are expanded (see FIG. 6 of Patent Document 1). In this manner, the C-shaped fixing member is strongly pressed against the inner peripheral surface side of the rotor so as to be fixed, and the channel member is sandwiched between the fixing member and the rotor.

In the centrifugal field-flow fractionation device assembled as described above, the rotor is rotated so that the channel member attached to the rotor is rotated, and a centrifugal force can be applied to a liquid sample in the channel. As a result, particles contained in the liquid sample flowing into the channel from the inlet flow out from the outlet at different timings according to the specific gravity. In this manner, the particles in the liquid sample are classified according to the specific gravity.

PRIOR ART DOCUMENT

Patent Document

Patent Document 1: JP-T-2014-518761

SUMMARY OF THE INVENTION

Problems to be Solved by the Invention

However, in the conventional configuration as described above, there has been a problem that the liquid sample in the channel easily leaks to the outside. That is, the fixing member is fixed so as to be strongly pressed against the inner peripheral surface of the rotor so that the layers of the channel member are brought into close contact with each other and the channel is sealed. Accordingly, for example in a case where the pressure in the channel becomes higher than a pressing force of the fixing member, a gap may be formed between the layers of the channel member and the liquid sample may leak out.

In particular, in a state where the rotational speed of the rotor is high, the pressure in the channel is high, so that the liquid sample is likely to leak from the gap between the layers of the channel member. In a state where the rotational speed of the rotor is high, the force by which the fixing member presses the channel member toward the rotor also increases. However, according to an experiment conducted by the inventor of the present invention, the pressure in the channel increases more than the force. Accordingly, the result that the liquid sample is more likely to leak from the channel as the rotational speed of the rotor increases has been obtained.

Further, in the conventional configuration, the intermediate layer is formed of an elastic material, such as polytetrafluoroethylene (PTFE), in order to bring the layers of the channel member into close contact with each other. Therefore, when a long time elapses in a state where the channel member is strongly pressed against the rotor by the fixing member, the sealing performance between the layers is deteriorated due to the deterioration of the intermediate layer, and the liquid sample easily leaks from the channel.

Furthermore, when the channel member is attached and detached, it is necessary to handle each of the layers constituting the channel member individually. Therefore, since it is necessary to individually attach and detach the layers while paying attention not to cause dirt to be attached to each layer and not to cause attachment positions of the layers to be shifted from each other, there is a problem that the attachment and detachment work becomes complicated.

The present invention has been made in view of the above-described circumstances, and an object of the present invention is to provide a centrifugal field-flow fractionation device in which a liquid sample is less likely to leak from the channel and attachment and detachment work of the channel member is facilitated.

Means for Solving the Problems

The centrifugal field-flow fractionation device according to the present invention includes an annular rotor, an arc-shaped channel member, and a rotation drive unit. The rotor rotates about a rotation axis. The channel member is provided along an inner peripheral surface of the rotor, and has an arc-shaped outer peripheral surface formed on a side of the rotor and an arc-shaped inner peripheral surface formed on a side of the rotation axis. Further, the channel member has a channel for a liquid sample formed inside, an inlet through which the liquid sample flows to the channel, and an outlet through which the liquid sample flows out from the channel. The rotation drive unit rotates the rotor so that particles in the liquid sample in the channel are classified by a centrifugal force. The channel member includes a hollow member having the channel formed inside by integrally forming the outer peripheral surface and the inner peripheral surface.

According to such a configuration, by integrally forming the outer peripheral surface and the inner peripheral surface of the channel member, the channel member can be configured as one hollow member having the channel formed inside. In this manner, pressure resistance performance of the channel member is improved, and formation of a gap in the channel can be prevented even in a case where pressure in the channel is high or in a case where the rotational speed of the rotor is high, and also deterioration in sealing performance due to secular change is not generated. Accordingly, the liquid sample is less likely to leak from the channel. Further, since the channel member can be handled as one member, it is possible to attach and detach the channel member at one time without paying attention to adhesion of dirt and the like to the inside of the channel, which facilitates attachment and detachment work of the channel member.

The centrifugal field-flow fractionation device may further include a fixing member that is provided along the inner peripheral surface of the channel member, and presses and fixes the channel member toward the rotor.

According to such a configuration, the channel member can be pressed toward the rotor by the fixing member so as to be fixed firmly. The channel member has a liquid-tight structure as a one member having the channel formed inside, and therefore, it is not necessary to increase the pressing force from the fixing member to the channel member as high as that in a conventional configuration. As a result, sealing performance deterioration due to deformation of the channel member is not caused, and the liquid sample is less likely to leak from the channel.

The channel member may include a laminate formed of a plurality of layers joined to each other, the plurality of layers including an outer surface layer on which the outer peripheral surface is formed and an inner surface layer on which the inner peripheral surface is formed.

According to such a configuration, by joining a plurality of layers including the outer surface layer and the inner surface layer to each other, it is possible to configure the channel member having a liquid-tight structure in which the channel is formed. In this manner, by forming the channel by combining a plurality of layers, the degree of freedom in the shape of the channel can be increased.

The plurality of layers may be joined to each other by diffusion bonding.

According to such a configuration, diffusion bonding can be used to firmly bond the plurality of layers to each other. In a case of joining the layers, if an attempt is made to join the layers after being deformed in an arc shape, shapes of the layers vary, and it is difficult to join the layers in an excellent manner. Accordingly, the layers are preferably deformed in an arc shape after being joined in a straight state. Even in such a case, if the layers are firmly joined using diffusion bonding, the layers do not easily come off when deformed in an arc shape. Accordingly, the liquid sample is less likely to leak from the channel. Further, in a case where diffusion bonding is used, no irregular shape is generated at a joined portion. Accordingly, the joined portion does not influence the flow of the liquid sample in the channel, and lowering in classification performance can be prevented.

The plurality of layers may be formed of a same kind of material.

According to such a configuration, since all of the layers constituting a wall surface of the channel are formed of the same kind of material, it is easy to predict the influence of a state of the wall surface of the channel on the classification performance. Further, the layers formed of the same kind of material are easily joined since they are thermally deformed in a similar mode at the time of joining under a high temperature, and the layers hardly come off even when the layers are cooled after being joined. Therefore, the liquid sample is even less likely to leak from the channel.

The channel may have a bending portion or a curved portion that changes a flowing direction of the liquid sample in a plane parallel to the outer peripheral surface and the inner peripheral surface.

According to such a configuration, since the flowing direction of the liquid sample can be changed by the bending portion or the curved portion to form a long channel, the classification performance can be improved. Further, in a case where the channel of a complicated shape having the bending portion or the curved portion is to be formed by a laminated structure, it becomes extremely difficult to handle the layers individually. However, by configuring the channel member as one member by integrally forming the layers, the attachment and detachment work of the channel member is extremely facilitated.

The channel member may have a plurality of divided channels extending in an arc shape and arranged in a radial direction, and the channel may be configured by the divided channels communicating with each other.

According to such a configuration, the long channels can be formed by allowing the plurality of divided channels arranged in a radial direction to communicate with each other. Accordingly, the classification performance can be improved. As compared to the configuration in which the bending portion or the curved portion is provided in the channel, a flow rate of the liquid sample in the channel is less likely to vary, and the separation performance can be more effectively improved.

The channel member may have a plurality of the channels formed in a same plane parallel to the outer peripheral surface and the inner peripheral surface, and the inlet and the outlet may be formed in a manner corresponding to each of the channels.

According to such a configuration, the liquid sample can be individually introduced into the plurality of channels. Therefore, if the channel to be used is switched as necessary, particles in the liquid sample can be classified using different ones of the channels without attaching or detaching the channel member. Further, if the plurality of channels are used at the same time, work efficiency can be improved.

Effects of the Invention

According to the present invention, the pressure resistance performance of the channel member is improved, formation of a gap in the channel can be prevented, and deterioration in sealing performance due to secular change is not generated. Accordingly, the liquid sample is less likely to leak from the channel. Further, since the channel member can be handled as one member, attachment and detachment work of the channel member is facilitated.

MODE FOR CARRYING OUT THE INVENTION

Figure 1:
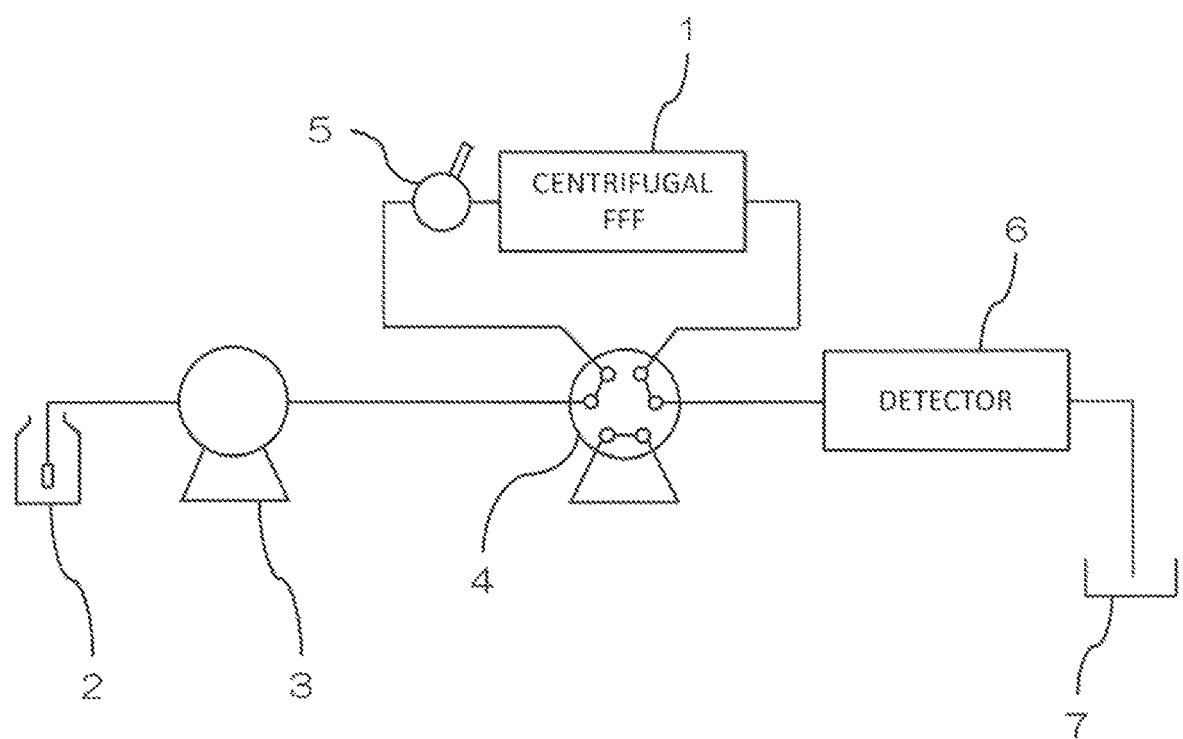
FIG. 1 is a schematic diagram showing a configuration example of an analysis system including a centrifugal field-flow fractionation device according to an embodiment of the present invention.

FIG. 1 is a schematic diagram showing a configuration example of an analysis system including a centrifugal field-flow fractionation device 1 according to an embodiment of the present invention. The centrifugal field-flow fractionation device 1 is a device for classifying particles contained in a liquid sample according to specific gravity using field-flow fractionation. The analysis system shown in FIG. 1 includes a carrier storage unit 2, a liquid feed pump 3, a rotary valve 4, a sample injection device 5, a detector 6, and a carrier collection unit 7, in addition to the centrifugal field-flow fractionation device 1.

The carrier storage unit 2 stores a carrier fluid made of, for example, water or an organic solvent. The carrier fluid is pumped out of the carrier storage unit 2 by the liquid feed pump 3 and supplied to the centrifugal field-flow fractionation device 1 through the rotary valve 4. The sample injection device 5 is provided between the rotary valve 4 and the centrifugal field-flow fractionation device 1, and the carrier fluid into which a sample is injected from the sample injection device 5 is supplied, as a liquid sample, to the centrifugal field-flow fractionation device 1.

The liquid sample contains a large number of particles to be analyzed. The particles contained in the liquid sample are classified by application of a centrifugal force in the centrifugal field-flow fractionation device 1 and flow out of the centrifugal field-flow fractionation device 1 at different timings according to the specific gravity. Particles that sequentially flow out of the centrifugal field-flow fractionation device 1 are sent to the detector 6 together with the carrier fluid via the rotary valve 4, and, after being detected by the detector 6, the particles are collected by the carrier collection unit 7. Start or stop of supply of the liquid sample to the centrifugal field-flow fractionation device 1 can be switched by rotation of the rotary valve 4.

Figure 2:
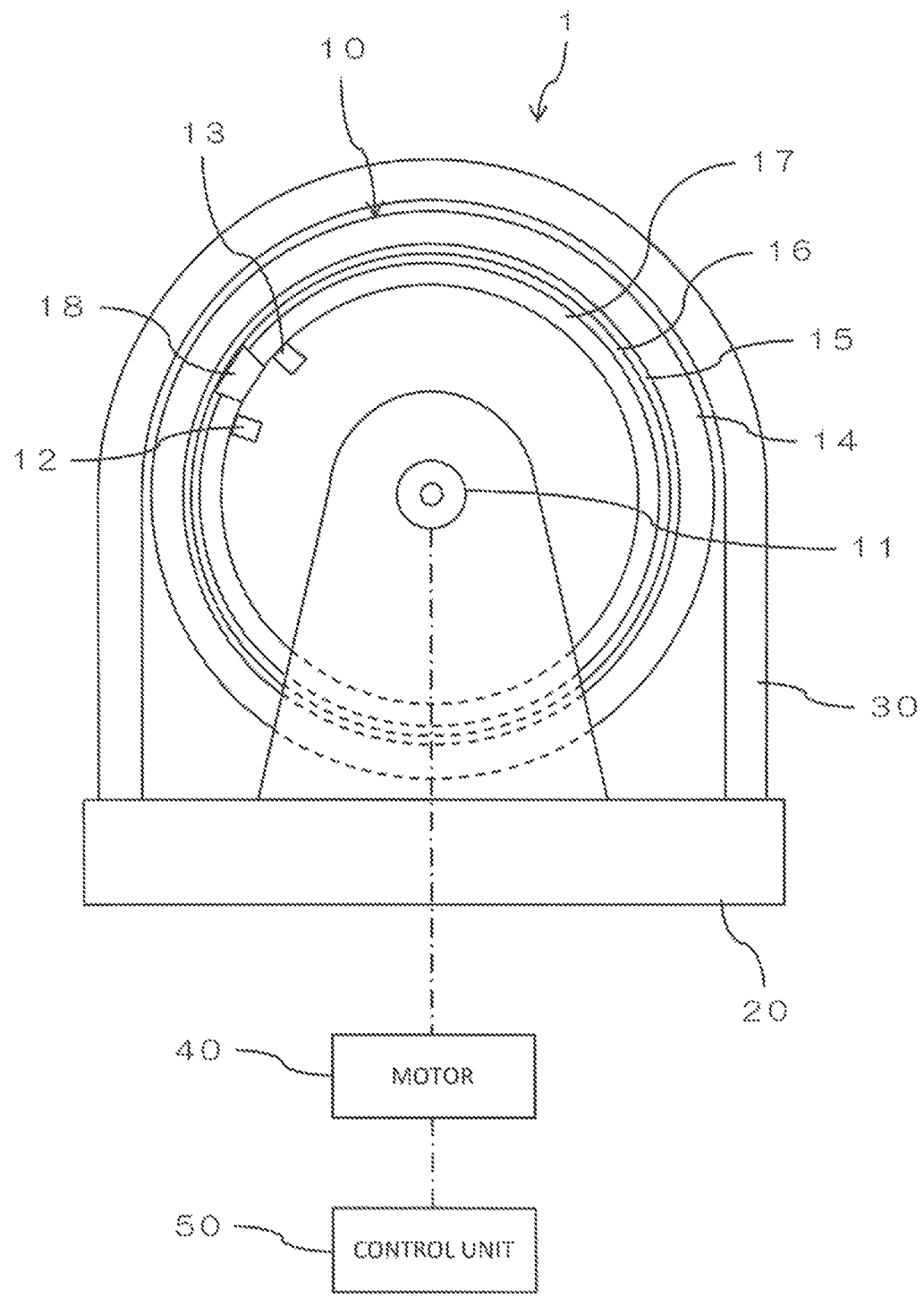
FIG. 2 is a schematic front view showing a configuration example of the centrifugal field-flow fractionation device.

FIG. 2 is a schematic front view showing a configuration example of the centrifugal field-flow fractionation device 1. The centrifugal field-flow fractionation device 1 is configured by assembling a rotation unit 10 that rotates about a rotational shaft 11, a holding table 20 that rotatably holds the rotational shaft 11, and a protective wall 30 for preventing a worker being in contact with the rotating rotation unit 10.

The rotation unit 10 is formed in, for example, a cylindrical shape, and is held by the holding table 20 so that the rotational shaft 11 attached to a central portion of the rotation unit 10 extends in a horizontal direction. The protective wall 30 is, for example, a U-shaped member curved in a shape corresponding to an outer peripheral surface of the rotation unit 10, and is attached to the holding table 20 in a state of being opposed to the outer peripheral surface at a minute distance so as to cover the outer peripheral surface of the rotation unit 10.

The rotational shaft 11 is formed in a hollow shape, and a liquid sample is supplied into the rotational shaft 11 from, for example, one end of the rotational shaft 11. The rotation unit 10 is provided with an introduction unit 12 into which a liquid sample before being classified is introduced and a discharge unit 13 from which a liquid sample after being classified is drawn. The introduction unit 12 and the discharge unit 13 communicate with the inside of the rotational shaft 11 via a pipe (not shown). In this manner, the liquid sample supplied into the rotational shaft 11 is introduced from the introduction unit 12 to the rotation unit 10 through the pipe. After particles in the sample liquid are classified in the rotation unit 10, the liquid sample is introduced to the rotational shaft 11 from the discharge unit 13 through a pipe and sent to the detector 6.

A motor 40, which is an example of a rotation drive unit, is connected to the rotational shaft 11. By driving the motor 40, the rotation unit 10 can be rotated to apply a centrifugal force to the liquid sample in the rotation unit 10. The driving of the motor 40 is controlled by a control unit 50 including, for example, a central processing unit (CPU). However, the rotation unit 10 can also be rotated using a rotation drive unit other than the motor 40.

Figure 3:
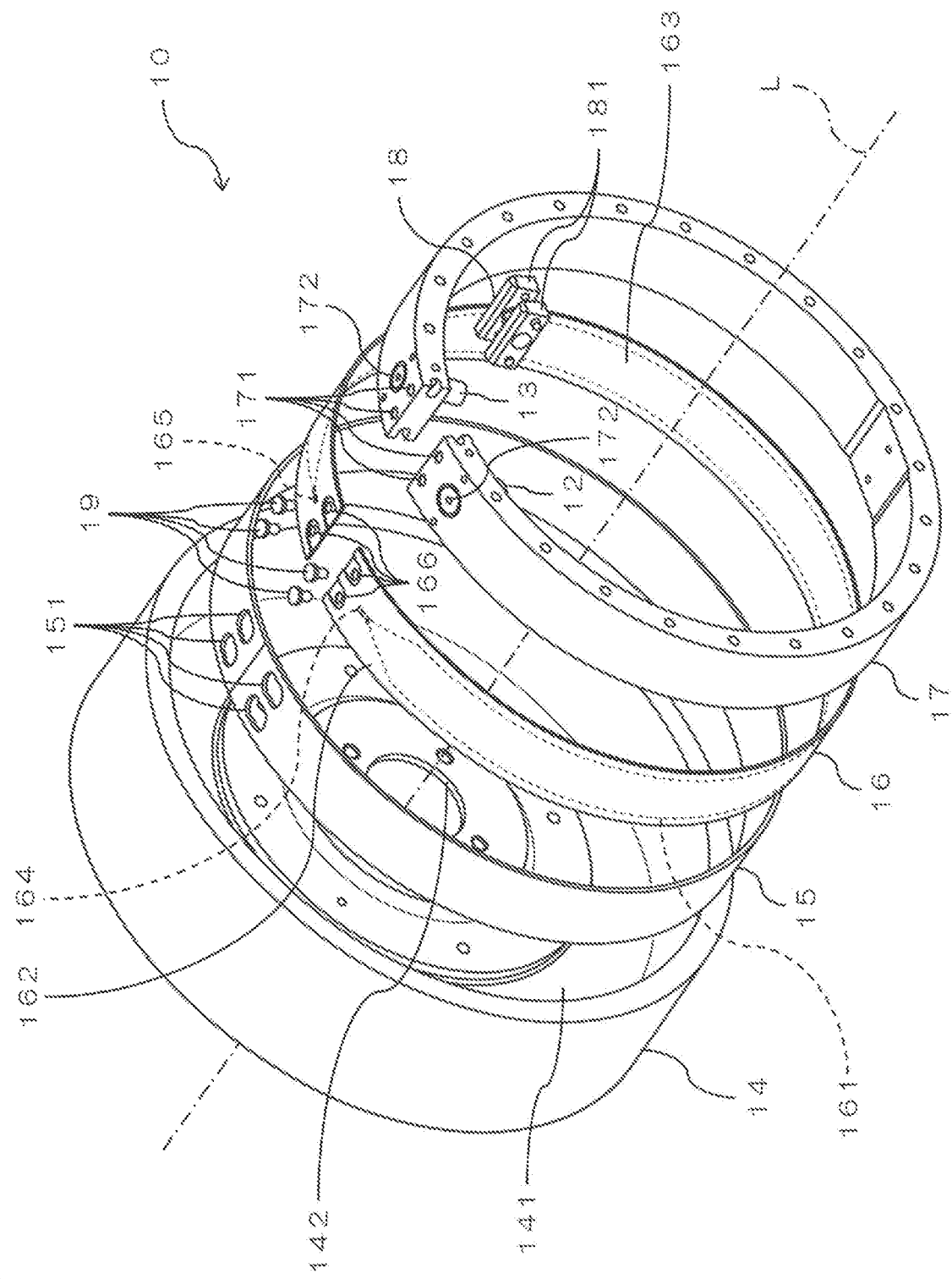
FIG. 3 is an exploded perspective view showing a configuration example of a rotation unit.

FIG. 3 is an exploded perspective view showing a configuration example of the rotation unit 10. The rotation unit 10 is configured as a cylindrical member as a whole by assembling, for example, a rotor 14, a spacer 15, a channel member 16, a fixing member 17, and a wedge-shaped member 18.

The rotor 14 is an annular member, and has one end face closed by an end face wall 141. The end face wall 141 is formed in a disk shape, and an insertion hole 142 into which the rotational shaft 11 is inserted is formed in a central portion of the end face wall 141. By inserting the rotational shaft 11 into the insertion hole 142 and fixing it to the end face wall 141, the rotor 14 can be rotated about a rotation axis L coaxial with the rotational shaft 11, along with rotation of the rotational shaft 11.

The spacer 15, the channel member 16, the fixing member 17, and the wedge-shaped member 18 are accommodated in space on an inner side (the rotation axis L side) of the rotor 14. The spacer 15, the channel member 16, and the fixing member 17 have a shape in which an elongated member is curved in an arc shape, and are fixed in a state of being stacked in this order along an inner peripheral surface of the rotor 14. The radii of curvature of the spacer 15, the channel member 16, and the fixing member 17 are, for example, about 50 to 200 mm.

The channel member 16 is, for example, a thin plate having a thickness of 1 mm or less, and is formed in a C shape with both ends in a circumferential direction facing each other with space between them. A channel 161 extending in a circumferential direction is formed in the inside of the channel member 16. That is, the channel member 16 has an arc-shaped outer peripheral surface 162 formed on a side of the rotor 14, and an arc-shaped inner peripheral surface 163 formed on a side of the rotation axis L. The channel 161 is formed between the outer peripheral surface 162 and the inner peripheral surface 163.

An inlet 164 through which the liquid sample flows to the channel 161 is formed at one circumferential end on the inner peripheral surface 163 of the channel member 16. On the other hand, an outlet 165 through which the liquid sample flows out from the channel 161 is formed at the other circumferential end on the inner peripheral surface 163 of the channel member 16. In this manner, the liquid sample flowing from the inlet 164 into the channel 161 flows in the channel 161 along the circumferential direction from one end to the other end, and flows out from the outlet 165.

When classification of the particles in the liquid sample is performed, first, the rotation unit 10 is rotated by the drive of the motor 40, and a rotational speed of the rotation unit 10 is gradually increased. Then, when the rotational speed of the rotation unit 10 reaches a certain value (for example, 5000 rpm), the liquid sample is injected from the inlet 164 in a state where the rotational speed is maintained.

After the liquid sample is injected into the channel 161 for a certain period of time, the supply of the liquid sample is stopped by switching of the rotary valve 4 and the rotation unit 10 is continuously rotated. In this manner, particles in the liquid sample in the channel 161 are centrifugally settled. After the above, the supply of the liquid sample is resumed by switching of the rotary valve 4, and the rotational speed of the rotation unit 10 is gradually lowered after a certain period of time.

In this manner, particles in the liquid sample are sent to the downstream side, from a particle having a smallest specific gravity to the one having a largest specific gravity, along with the flow of the liquid sample in the channel 161 and sequentially flow out from the outlet 165. In this manner, the particles in the liquid sample in the channel 161 are classified by a centrifugal force, and flow out from the outlet 165 at different timings according to the specific gravity, and are sent to the detector 6.

The fixing member 17 is a member having a thickness larger than that of the channel member 16 and is formed to have a thickness of, for example, about 10 mm. Like the channel member 16, the fixing member 17 is formed in a C-shape with the ends in the circumferential direction facing each other with space between them. A circumferential length of the fixing member 17 substantially matches with a circumferential length of the channel member 16. The fixing member 17 is provided along the inner peripheral surface 163 of the channel member 16 on the inner side (rotation axis L side) of the channel member 16.

At the ends in the circumferential direction of the fixing member 17, a plurality of screw holes 171 into which bolts 19 are screwed are formed. The bolts 19 are an example of a locking tool. At the ends in the circumferential direction of the channel member 16, a plurality of insertion holes 166 are formed at positions facing the screw holes 171 of the fixing member 17. In this manner, the channel member 16 can be attached to the fixing member 17 by inserting the bolt 19 from the outside into each of the insertion holes 166 and screwing it into each of the screw holes 171. However, the locking tool is not limited to the bolt 19, but may be formed of other members, such as a pin.

Further, through-holes 172 are formed at the ends in the circumferential direction of the fixing member 17 at positions facing the inlet 164 and the outlet 165 formed on the inner peripheral surface 163 of the channel member 16. The introduction unit 12 and the discharge unit 13 are attached to the inner peripheral surface of the fixing member 17 so as to communicate with the through-holes 172. In this manner, the liquid sample introduced from the introduction unit 12 flows into the channel 161 from the inlet 164 via one of the through-holes 172, flows in the channel 161 in the circumferential direction, and then is discharged from the outlet 165 through the other one of through-holes 172 and the discharge unit 13.

The channel 161 in the channel member 16 is set to have a different height according to a type of a carrier fluid, a condition of analysis, and the like. For this reason, the channel member 16 is formed to have a different thickness according to the height of the channel 161, and an optimal one of the channel members 16 is selected from a plurality of types of the channel members 16 and attached to the fixing member 17.

The fixing member 17 to which the channel member 16 is attached as described above is inserted into space inside the rotor 14, and is fixed along the inner peripheral surface of the rotor 14 in such a manner that the channel member 16 is sandwiched between the fixing member 17 and the rotor 14. At this time, with the wedge-shaped member 18 attached between the ends of the C-shaped fixing member 17, a force is applied in a direction in which the ends are expanded.

In this manner, the C-shaped fixing member 17 is strongly pressed toward the inner peripheral surface of the rotor 14, and the channel member 16 is pressed and fixed toward the rotor 14. When particles in the liquid sample are classified, the rotor 14 is rotated at high speed, so that the inside of the channel 161 has high pressure (for example, about 1 MPa), and a pressure difference between the inside and outside of the channel 161 becomes large. However, since the channel member 16 is sandwiched between the fixing member 17 and the rotor 14, the outer peripheral surface 162 and the inner peripheral surface 163 of the channel member 16 can be prevented from being deformed to an opposite side to the channel 161 side due to the pressure difference.

In the present embodiment, the spacer 15 is sandwiched between the channel member 16 and the rotor 14. Although a material of the spacer 15 is not particularly limited, the spacer 15 is made from, for example, resin, such as polyethylene terephthalate (PET), or metal. The spacer 15 is formed to be slightly longer than the channel member 16, and long holes 151 are formed at the ends in the circumferential direction at positions facing the insertion holes 166 of the channel member 16.

A head of the bolt 19 inserted into each of the insertion holes 166 of the channel member 16 is accommodated in a corresponding one of the long holes 151 of the spacer 15. Each of the long holes 151 is formed to extend in the circumferential direction. In this manner, in a state where the head of each of the bolts 19 is accommodated in a corresponding one of the long holes 151, when the ends of the fixing member 17 are expanded by the wedge-shaped member 18 and the fixing member 17 is strongly pressed toward the inner peripheral surface of the rotor 14, the spacer 15 and the channel member 16 are sandwiched between the fixing member 17 and the rotor 14 while the head of each of the bolts 19 slides in the circumferential direction in a corresponding one of the long holes 151.

The spacer 15 is, for example, thin plate-like and has a thickness of 1 mm or less, and one having a different thickness depending on the thickness of the channel member 16 is selected. That is, the spacer 15 having an optimum thickness is selected, so that a total value of the thickness of the spacer 15 and the thickness of the channel member 16 is substantially constant. Further, the spacer 15 also has a function of preventing damage to the inner peripheral surface of the rotor 14. However, the spacer 15 can be omitted.

Figure 4:
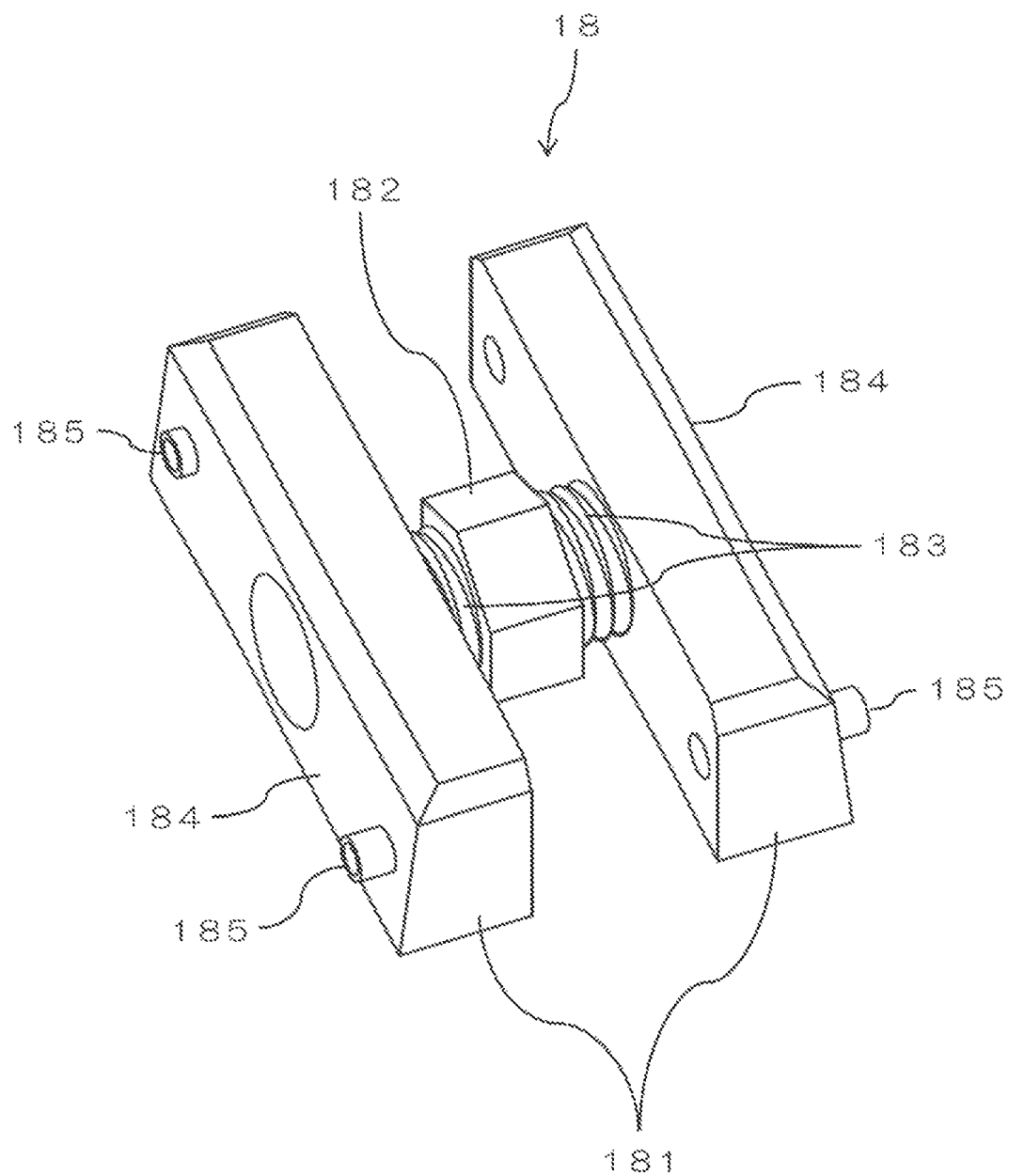
FIG. 4 is a perspective view showing a configuration example of a wedge-shaped member.

FIG. 4 is a perspective view showing a configuration example of the wedge-shaped member 18. The wedge-shaped member 18 includes, for example, two nut portions 181 and one bolt portion 182. The bolt portion 182 has two shaft portions 183 extending in opposite directions along an axial direction. One of the shaft portions 183 is formed with a right-handed screw, and the other one of the shaft portions 183 is formed with a left-handed screw.

The two nut portions 181 face each other with the bolt portion 182 interposed therebetween. One of the shaft portions 183 of the bolt portion 182 is screwed into one of the nut portions 181, and the other shaft portion 183 of the bolt portion 182 is screwed into the other nut portion 181. Therefore, rotating the bolt portion 182 in one direction allows the two nut portions 181 to approach each other, and rotating the bolt portion 182 in the opposite direction allows the two nut portions 181 to be separated from each other.

The wedge-shaped member 18 is provided between the ends of the C-shaped fixing member 17, and surfaces of the nut portions 181 opposite to those on the bolt portion 182 side constitute contact surfaces 184 that are to be in contact with the ends of the fixing member 17. Therefore, by rotating the bolt portion 182 in a state in which the contact surfaces 184 are in contact with the ends of the fixing member 17, and expanding or contracting a distance between the ends of the fixing member 17, a pressing force of the fixing member 17 toward the rotor 14 can be adjusted, or the fixing member 17 can be attached and detached.

The contact surface 184 of each of the nut portions 181 is formed by a tapered surface that gradually tapers toward the outer side (the rotor 14 side). The ends of the fixing member 17 to be in contact with the contact surfaces 184 are also formed by tapered surfaces so that the ends are gradually closer to each other toward the outer side (the rotor 14 side).

Therefore, when the distance between the ends of the fixing member 17 is increased by rotating the bolt portion 182 to separate the two nut portions 181 from each other in a state where the wedge-shaped member 18 is provided between the ends of the fixing member 17, the contact surfaces 184 of the nut portions 181 push the ends of the fixing member 17 toward the outer side (the rotor 14 side). In this manner, the fixing member 17 can be pressed toward the rotor 14 with a higher pressing force.

One or a plurality of projections 185 is formed on the contact surface 184 of each of the nut portions 181, and the projections 185 are locked with recesses (not shown) formed on the ends of the fixing member 17. In this manner, the wedge-shaped member 18 is positioned between the ends of the fixing member 17. However, the configuration may be such that recesses are formed in the wedge-shaped member 18 side, and projections are formed in the fixing member 17 side. Further, the configuration of the wedge-shaped member 18 is not limited to the above configuration, and other optional configurations may be employed as long as the wedge-shaped member can be fixed in a manner pressing the fixing member 17 toward the rotor 14.

Figure 5:
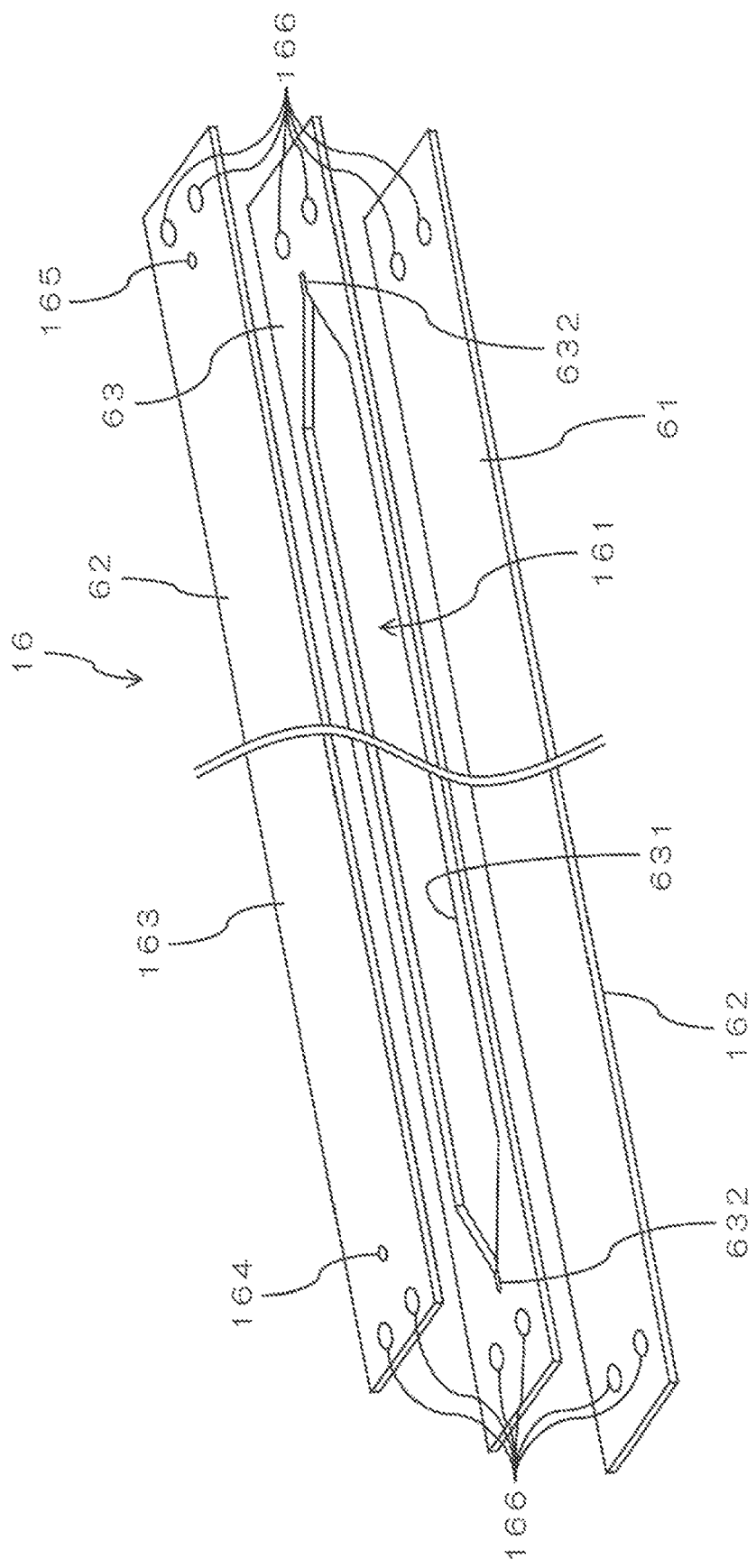
FIG. 5 is an exploded perspective view showing a configuration example of the channel member, showing a state before the channel member is curved in an arc shape when viewed from an inner peripheral surface side.

FIG. 5 is an exploded perspective view showing a configuration example of the channel member 16, showing a state before the channel member 16 is curved in an arc shape when viewed from the inner peripheral surface 163 side. The channel member 16 includes, for example, a laminate having a three-layer structure in which an outer surface layer 61, an inner surface layer 62, and an intermediate layer 63 are stacked. The intermediate layer 63 is provided between the outer surface layer 61 and the inner surface layer 62. Each of the layers 61, 62, and 63 is formed of, for example, stainless steel (SUS), and has a thickness of about 0.25 mm.

The surface of the outer surface layer 61 on the opposite side to the intermediate layer 63 side constitutes the outer peripheral surface 162 of the channel member 16 when the channel member 16 is curved in an arc shape. Further, the surface of the inner surface layer 62 on the opposite side to the intermediate layer 63 side constitutes the inner peripheral surface 163 of the channel member 16 when the channel member 16 is curved in an arc shape.

On the intermediate layer 63, an opening 631 penetrating the intermediate layer 63 and extending straight in a longitudinal direction is formed. The opening 631 can be formed by, for example, etching or electrical discharge machining. Both ends in the longitudinal direction of the opening 631 are formed in a gradually tapered triangle shape, and each tip is an elongated port portion 632 protruding in the longitudinal direction.

The intermediate layer 63 is sandwiched between the outer surface layer 61 and the inner surface layer 62, and the outer and inner sides of the opening 631 (including the port portions 632) are closed, so that the channel 161 is formed between the outer surface layer 61 and the inner surface layer 62. The channel member 16 integrally formed in this manner is curved in an arc shape having an inner diameter substantially the same as an outer diameter of the fixing member 17 using a bending roll (a bending machine for a sheet metal) or the like.

The inlet 164 and the outlet 165 are formed at positions facing the port portions 632 on the inner surface layer 62. In this manner, in a state where the layers 61, 62, and 63 are stacked, the inlet 164 and the outlet 165 communicate with the channel 161 from the port portions 632. Through-holes are formed at positions facing each other at the ends in the longitudinal direction on the layers 61, 62, and 63, and these through-holes constitute insertion holes 166 into which the bolts 19 are inserted.

In the present embodiment, a plurality of layers, that is, the outer surface layer 61, the inner surface layer 62, and the intermediate layer 63, are joined to one another to constitute a laminate. That is, the outer surface layer 61 is joined to the intermediate layer 63, and the inner surface layer 62 is joined to the intermediate layer 63. In this manner, the outer peripheral surface 162 and the inner peripheral surface 163 of the channel member 16 are integrally formed, and the channel member 16 is configured as one hollow member having the channel 161 formed inside.

In this manner, pressure resistance performance of the channel member 16 is improved, and formation of a gap in the channel 161 can be prevented even in a case where pressure in the channel 161 is high or in a case where the rotational speed of the rotor 14 is high, and also deterioration in sealing performance due to secular change is not generated. Accordingly, the liquid sample is less likely to leak from the channel 161. Further, since the channel member 16 can be handled as one member, it is possible to attach and detach the channel member 16 at one time without paying attention to adhesion of dirt and the like in the channel 161, which facilitates attachment and detachment work of the channel member 16.

Further, in the present embodiment, the channel member 16 can be pressed toward the rotor 14 by the fixing member 17 so as to be fixed firmly. The channel member 16 has a liquid-tight structure as one member having the channel 161 formed inside, and therefore, it is not necessary to increase the pressing force from the fixing member 17 to the channel member 16 as high as that in a conventional configuration. As a result, sealing performance deterioration due to deformation of the channel member 16 is not caused, and the liquid sample is less likely to leak from the channel 161.

In particular, in the present embodiment, the plurality of layers, that is, the outer surface layer 61, the inner surface layer 62, and the intermediate layer 63, are joined to one another, so that the channel member 16 having a liquid-tight structure in which the channel 161 is formed can be constituted. In this manner, by forming the channel 161 by combining a plurality of layers, the degree of freedom in the shape of the channel 161 can be increased.

The layers 61, 62, and 63 can be joined to each other, for example, by diffusion bonding. Diffusion bonding is a method of joining by using diffusion of atoms generated between joined surface by heating and pressurizing of the layers 61, 62, and 63, under a condition that a temperature is lower than or equal to a melting point, in a state in which the layers 61, 62, and 63 are in close contact. By using this diffusion bonding, the layers 61, 62, and 63 can be firmly joined to each other by joining of atoms.

In a case where the layers 61, 62, and 63 are joined, if an attempt is made to join the layers 61, 62, and 63 after being deformed in an arc shape, shapes of the layers 61, 62, and 63 vary, and it is difficult to join the layers in an excellent manner. Accordingly, the layers 61, 62, and 63 are preferably deformed in an arc shape after being joined in a straight state. Even in such a case, if the layers 61, 62, and 63 are firmly joined using diffusion bonding, the layers 61, 62, and 63 do not easily come off when deformed in an arc shape. Accordingly, the liquid sample is less likely to leak from the channel 161.

Further, in a case where diffusion bonding is used, no irregular shape is generated at a joined portion. Accordingly, the joined portion does not influence the flow of the liquid sample in the channel 161, and deterioration in classification performance can be prevented. However, joining of the layers 61, 62, and 63 is not limited to diffusion bonding, but can be performed by other methods, such as brazing, welding, or heat fusion.

In the present embodiment, since the plurality of layers 61, 62, and 63 constituting a wall surface of the channel 161 are formed of the same kind of material (for example, stainless steel), it is easy to predict influence of a state of the wall surface of the channel 161 on classification performance. Further, the layers 61, 62, and 63 formed of the same kind of material are easily joined since they are thermally deformed in a similar mode at the time of joining under a high temperature as in, for example, diffusion bonding and the like, and the layers 61, 62, and 63 hardly come off even when the layers are cooled after being joined. Therefore, the liquid sample is even less likely to leak from the channel 161.

However, the layers 61, 62, and 63 may be formed of other metal without limitation to stainless steel, and may be formed of a material other than metal. In a case where the layers 61, 62, and 63 are formed of metal, the layers 61, 62, and 63 can be joined by, for example, diffusion bonding, brazing, or welding. On the other hand, in a case where the layers 61, 62, and 63 are formed of resin, the layers 61, 62, and 63 can be joined, for example, by heat fusion.

Figure 6:
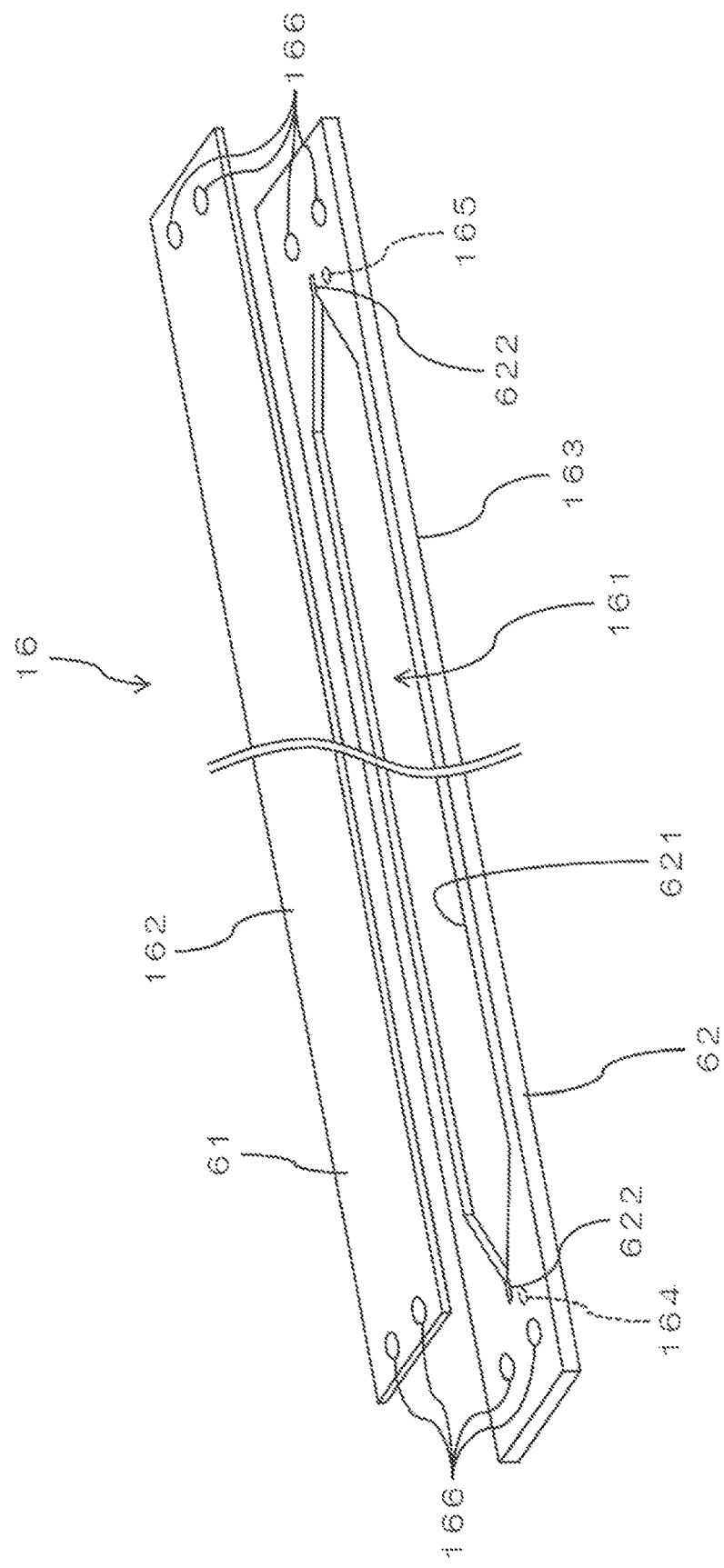
FIG. 6 is an exploded perspective view showing a first variation of the channel member, showing a state before the channel member is curved in an arc shape when viewed obliquely from the outer peripheral surface side.

FIG. 6 is an exploded perspective view showing a first variation of the channel member 16, showing a state before the channel member 16 is curved in an arc shape when viewed obliquely from the outer peripheral surface 162 side. The channel member 16 in this example includes, for example, a laminate of a two-layer structure in which the outer surface layer 61 and the inner surface layer 62 are stacked. Each of the layers 61 and 62 is formed of, for example, stainless steel (SUS), and the outer surface layer 61 has a thickness of about 0.25 mm, and the inner surface layer 62 has a thickness of about 0.5 mm.

The surface of the outer surface layer 61 on the opposite side to the inner surface layer 62 side constitutes the outer peripheral surface 162 of the channel member 16 when the channel member 16 is curved in an arc shape. Further, the surface of the inner surface layer 62 on the opposite side to the outer surface layer 61 side constitutes the inner peripheral surface 163 of the channel member 16 when the channel member 16 is curved in an arc shape.

The inner surface layer 62 is formed with a recess 621 extending straight in the longitudinal direction. The recess 621 is dug on the surface of the inner surface layer 62 by, for example, half etching, and does not penetrate the inner surface layer 62. The recess 621 is formed to have a depth of about half the thickness of the inner surface layer 62 (for example, about 0.25 mm). Both ends in the longitudinal direction of the recess 621 are formed in a gradually tapered triangle shape, and each tip is an elongated port portion 622 protruding in the longitudinal direction.

The outer surface layer 61 and the inner surface layer 62 are joined to each other, and the recess 621 (including the port portion 622) is closed with the outer surface layer 61, so that the channel 161 is formed between the outer surface layer 61 and the inner surface layer 62. The channel member 16 integrally formed in this manner is curved in an arc shape having an inner diameter substantially the same as the outer diameter of the fixing member 17 using a bending roll or the like.

At the tip of each of the port portions 622, the inlet 164 and the outlet 165 are formed to penetrate the inner surface layer 62. In this manner, in a state where the layers 61 and 62 are stacked, the inlet 164 and the outlet 165 communicate with the channel 161 from the port portions 622. Throughholes are formed at positions facing each other at the ends in the longitudinal direction on the layers 61 and 62, and these through-holes constitute the insertion holes 166 into which the bolts 19 are inserted.

However, the configuration is not limited to the configuration in which the recess 621 is formed on the inner surface layer 62, and may be a configuration in which the recess 621 is formed on the outer surface layer 61. In this case, the configuration may be such that the inlet 164 and the outlet 165 are only formed on the inner surface layer 62 at positions facing the port portions 622 of the recess 621 formed on the outer surface layer 61.

As in the example of FIG. 6, the structure of the channel member 16 is not limited to a three-layer structure but may be a two-layer structure. Further, it is also possible to configure the channel member 16 including a laminate of four or more layers. That is, the intermediate layer 63 provided between the outer surface layer 61 and the inner surface layer 62 may be formed of a plurality of layers instead of one layer.

Figure 7:
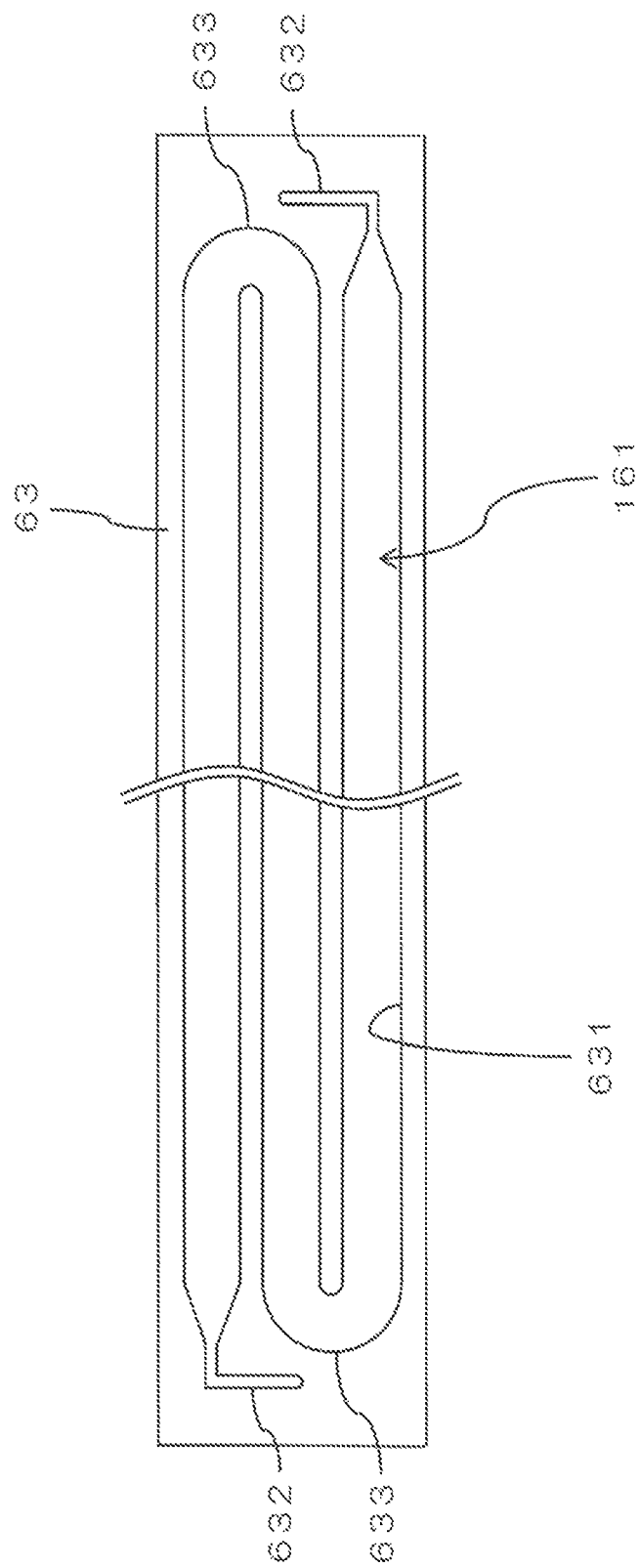
FIG. 7 is a diagram for describing a second variation of the channel member, showing a configuration example of the intermediate layer in a plan view.

FIG. 7 is a diagram for describing a second variation of the channel member 16, showing a configuration example of the intermediate layer 63 in a plan view. In this example, the configuration is not such that the opening 631 extends straight in the longitudinal direction, but that a curved portion 633 is formed in part of the opening 631 so that a flowing direction of the liquid sample flowing in the channel 161 is changed.

Specifically, the channel 161 is folded at the curved portion 633 such that the flowing direction of the liquid sample is changed by 180° in a plane parallel to the outer peripheral surface 162 and the inner peripheral surface 163 (in a plane parallel to the intermediate layer 63). Each of the port portions 632 provided at both ends of the opening 631 elongates to a position where a tip of the port portion 632 faces the inlet 164 or the outlet 165.

In this manner, the flowing direction of the liquid sample can be changed at the curved portion 633 to form the long channel 161, and the classification performance can be improved. Further, in a case where the channel 161 of a complicated shape having the curved portion 633 is to be formed by a laminated structure, it becomes extremely difficult to handle the layers (in this example, the intermediate layers 63) individually. However, by configuring the channel member 16 as one member by integrally forming the layers, the attachment and detachment work of the channel member 16 is extremely facilitated.

In this example, the two curved portions 633 are provided. However, three or more of the curved portions 633 may be provided. Further, a shape of the curved portion 633 is not limited to a shape that changes the flowing direction of the liquid sample by 180°, and may be a shape that changes the flowing direction of the liquid sample by other angles. Furthermore, even if the flowing direction of the liquid sample is changed not by the curved portion 633 but by a bending portion, a similar effect can be obtained.

In FIG. 7, the configuration has been described in which the opening 631 having the curved portion 633 is formed on the intermediate layer 63 of the channel member 16 having a three-layer structure. However, the configuration is not limited to such a configuration, and may be, for example, a configuration in which the recess 621 having a curved portion or a bending portion is formed on the outer surface layer 61 or the inner surface layer 62 of the channel member 16 having a two-layer structure as shown in FIG. 6. Further, the configuration may be one in which the opening 631 having a curved portion or a bending portion is formed in a plurality of intermediate layers 63 in the channel member 16 including a laminate of four or more layers.

Figure 8:
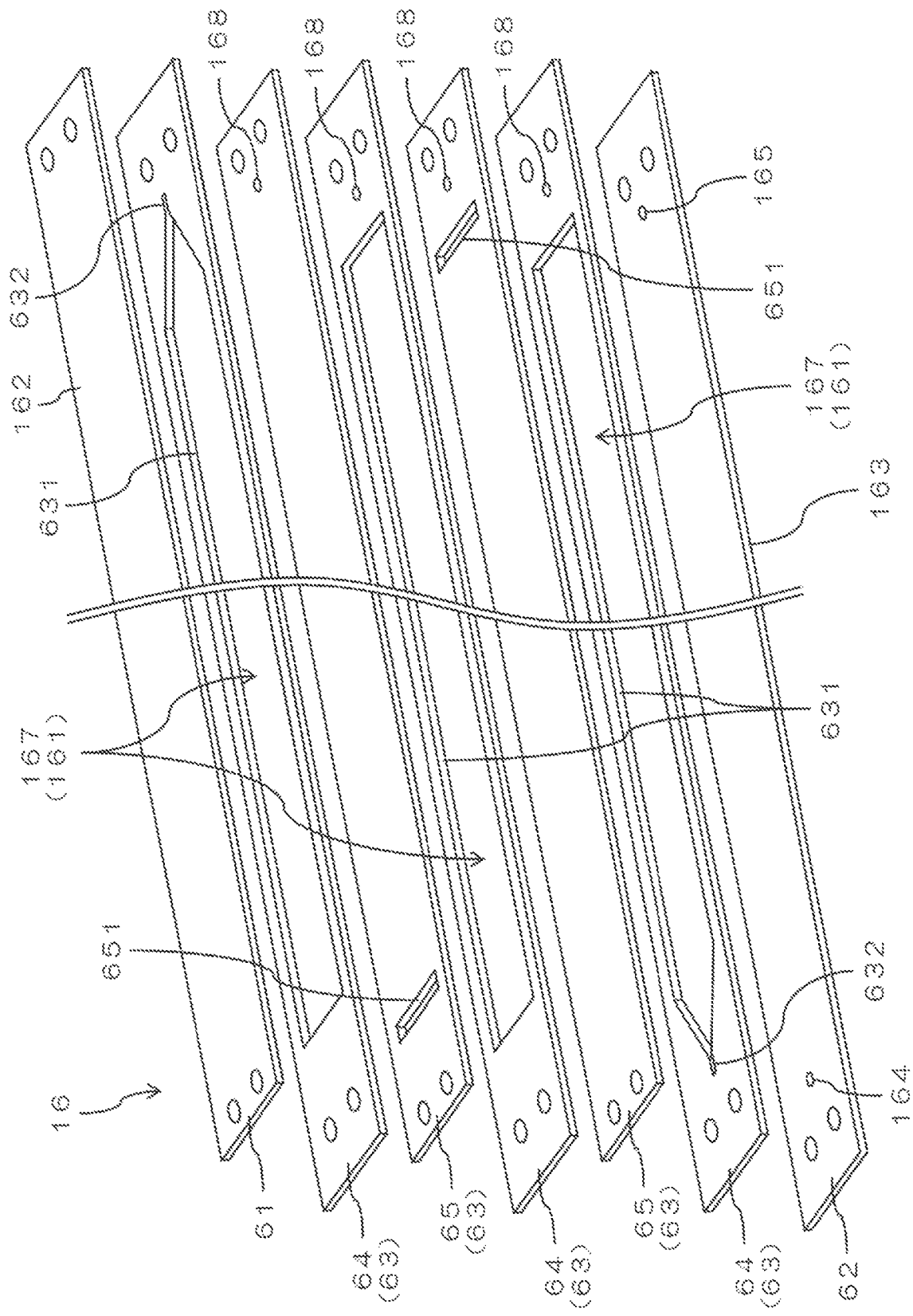
FIG. 8 is an exploded perspective view showing a third variation of the channel member, showing a state before the channel member is curved in an arc shape when viewed obliquely from the outer peripheral surface side.

FIG. 8 is an exploded perspective view showing a third variation of the channel member 16, showing a state before the channel member 16 is curved in an arc shape when viewed obliquely from the outer peripheral surface 162 side. The channel member 16 in this example includes, for example, a laminate in which the intermediate layers 63 including a plurality of layers are stacked between the outer surface layer 61 and the inner surface layer 62. In this example, the intermediate layers 63 include three channel layers 64 and two separation layers 65 provided between the channel layers 64, and the channel layers 64 and the separation layers 65 are stacked alternately. Each of the layers 61, 62, 64, and 65 is formed of, for example, stainless steel (SUS), and has a thickness of about 0.25 mm.

The surface of the outer surface layer 61 on the opposite side to the intermediate layer 63 side constitutes the outer peripheral surface 162 of the channel member 16 when the channel member 16 is curved in an arc shape. Further, the surface of the inner surface layer 62 on the opposite side to the intermediate layer 63 side constitutes the inner peripheral surface 163 of the channel member 16 when the channel member 16 is curved in an arc shape.

On each of the channel layers 64 constituting the intermediate layers 63, the opening 631 that penetrates the channel layer 64 and extends straight in the longitudinal direction is formed. The opening 631 can be formed by, for example, etching or electrical discharge machining. One end in the longitudinal direction of the opening 631 formed on the channel layer 64 closest to the outer surface layer 61 is formed in a gradually tapered triangle shape, and a tip is the elongated port portion 632 protruding in the longitudinal direction. Further, also for the opening 631 formed on the channel layer 64 closest to the inner surface layer 62, an end on the opposite side to that of the port portion 632 of the channel layer 64 closest to the outer surface layer 61 is formed in a gradually tapered triangle shape, and a tip is the elongated port portion 632 protruding in the longitudinal direction.

In a state where the layers 61, 62, 64, and 65 are stacked, the separation layer 65 provided between the channel layers 64 separates the openings 631 formed on the channel layers 64. A through-hole 651 is formed on each of the separation layers 65 at a position facing the end of the opening 631. Specifically, the through-hole 651 formed on the separation layer 65 on the outer surface layer 61 side faces the end of the opening 631 formed on the channel layer 64 closest to the outer surface layer 61 on the opposite side to the port portion 632 side. Further, the through-hole 651 formed in the separation layer 65 on the inner surface layer 62 side faces the end of the opening 631 formed on the channel layer 64 closest to the inner surface layer 62 on the opposite side to the port portion 632 side.

In this manner, a plurality of divided channels 167 constituted by the openings 631 formed in the channel layers 64 communicate with one another through the through-holes 651 formed on the separation layers 65 to constitute the continuous channel 161. The channel member 16 integrally formed in this manner is curved in an arc shape having an inner diameter substantially the same as the outer diameter of the fixing member 17 using a bending roll or the like. In a state where the channel member 16 is curved, the plurality of divided channels 167 extending in an arc shape is arranged in the radial direction (the stacking direction of the layers 61, 62, 64, and 65).

The inlet 164 and the outlet 165 are formed at positions facing the port portions 632 on the inner surface layer 62. On the intermediate layers 63 other than the channel layer 64 closest to the outer surface layer 61, small holes 168 are formed at positions facing the port portion 632 formed on the channel layer 64 closest to the outer surface layer 61. These small holes 168 have the same diameter as, for example, the outlet 165, and in a state where the layers 61, 62, 64, and 65 are stacked, the port portion 632 formed on the channel layer 64 closest to the outer surface layer 61 communicates with the outlet 165 via the small holes 168. In this manner, in a state where the layers 61, 62, 64, and 65 are stacked, the inlet 164 and the outlet 165 communicate with the channel 161 from the port portions 632.

In this example, the long channels 161 can be formed by allowing the plurality of divided channels 167 arranged in a radial direction to communicate with each other. Accordingly, the classification performance can be improved. As compared to the configuration in which the curved portion 633 is provided in the channel 161 as shown in FIG. 7, a flow rate of the liquid sample in the channel 161 is less likely to vary, and the separation performance can be more effectively improved.

However, the configuration is not limited to the configuration, in which the port portion 632 formed on the channel layer 64 closest to the inner surface layer 62 communicates with the inlet 164, and the port portion 632 formed on the channel layer 64 closest to the outer surface layer 61 communicates with the outlet 165. The configuration may be such that the port portion 632 formed on the channel layer 64 closest to the inner surface layer 62 communicates with the outlet 165, and the port portion 632 formed on the channel layer 64 closest to the outer surface layer 61 communicates with the inlet 164.

Figure 9:
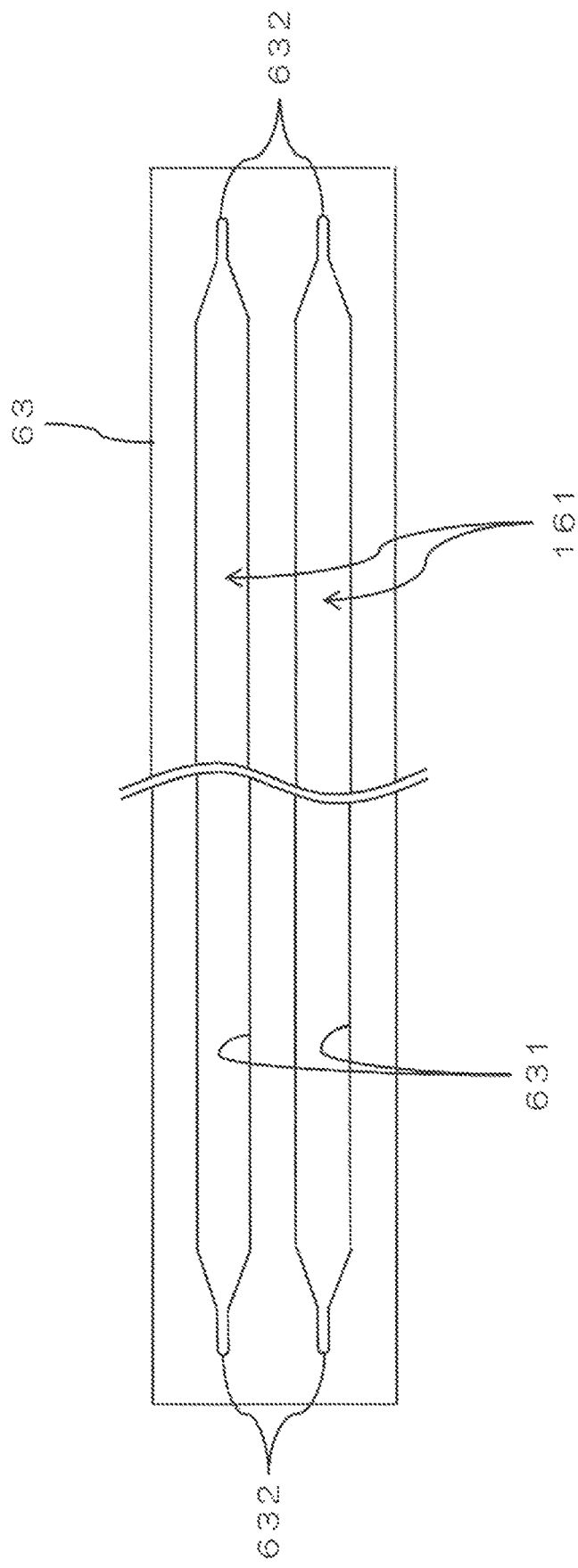
FIG. 9 is a diagram for describing a fourth variation of the channel member, showing a configuration example of the intermediate layer in a plan view.

FIG. 9 is a diagram for describing a fourth variation of the channel member 16, showing a configuration example of the intermediate layer 63 in a plan view. In this example, not one but two openings 631 that extend straight in the longitudinal direction of the intermediate layer 63 are formed. The openings 631 are formed in the same shape so as to extend in parallel to each other, and the port portions 632 are provided at both ends of the openings 631.

The inlet 164 is formed on the inner surface layer 62 at a position facing the port portion 632 formed at one end of each of the openings 631, and the outlet 165 is formed at a position facing the port portion 632 formed at the other end of each of the openings 631. Therefore, in a state where the outer surface layer 61, the inner surface layer 62, and the intermediate layer 63 are stacked, a plurality of channels 161 are formed in a plane parallel to the outer peripheral surface 162 and the inner peripheral surface 163 (in a plane parallel to the intermediate layer 63), and the inlet 164 and the outlet 165 are formed on the inner surface layer 62 in a manner corresponding to each of the channels 161. A plurality of inlets 164 and a plurality of outlets 165 are formed on the inner surface layer 62, and a different one of the introduction units 12 communicates with each of the inlets 164, and a different one of the discharge units 13 communicates with each of the outlets 165.

In this example, the liquid sample can be individually introduced into the plurality of channels 161. Therefore, if the channel 161 to be used is switched as necessary, particles in the liquid sample can be classified using different ones of the channels 161 without attaching or detaching the channel member 16. Further, if the plurality of channels 161 are used at the same time, work efficiency can be improved.

The number of the channels 161 is not limited to two, and may be three or more. Further, the channels 161 are not limited to those having the same shape, and may be formed in different shapes (for example, different lengths or different heights). Furthermore, the channel member 16 including a laminate having a two-layer structure as shown in FIG. 6 or the channel member 16 including a laminate of four or more layers as shown in FIG. 8 can have a configuration in which the plurality of channels 161 are formed in a plane parallel to the outer peripheral surface 162 and the inner peripheral surface 163 as in the example of FIG. 9.

Figure 10:
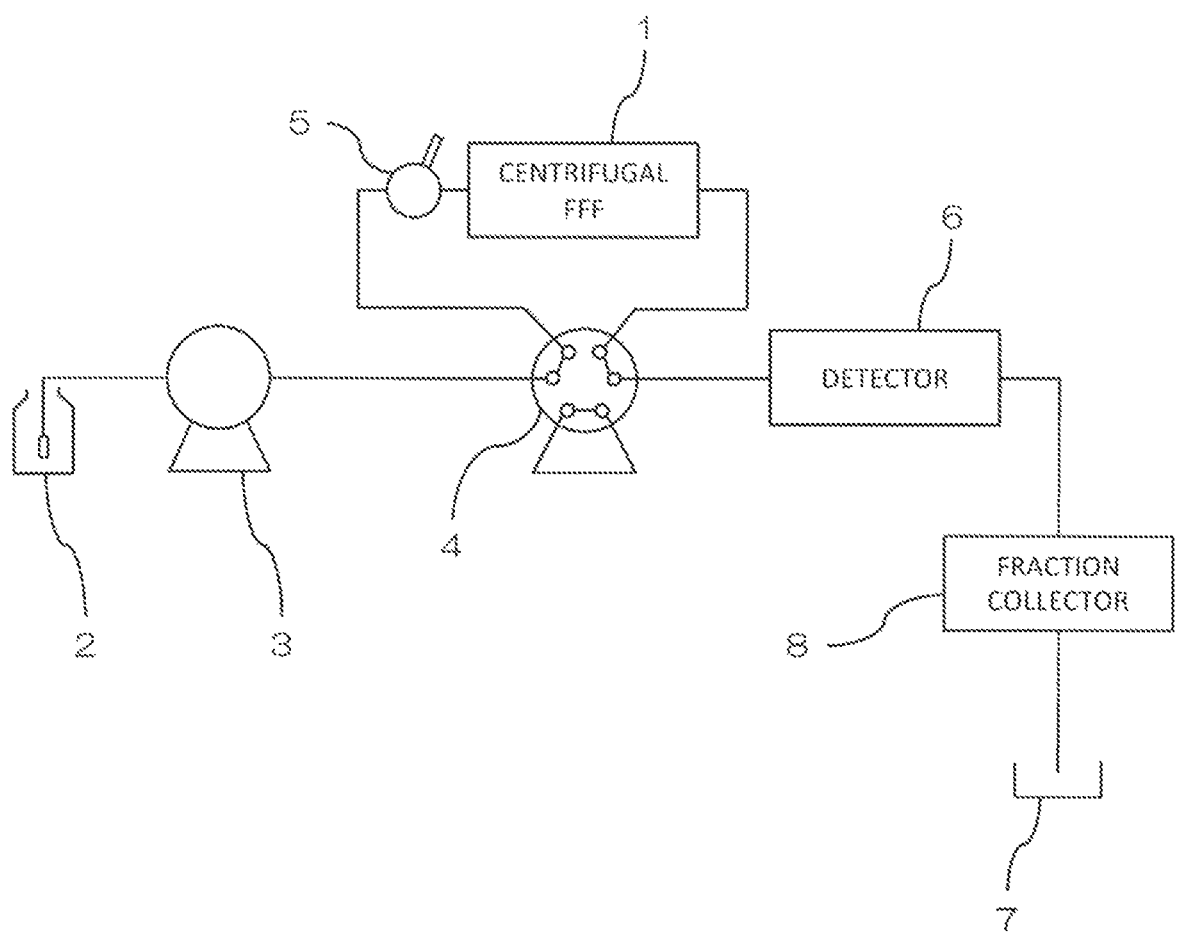
FIG. 10 is a schematic diagram showing a configuration example of an analysis system including a centrifugal field-flow fractionation device according to another embodiment.

FIG. 10 is a schematic diagram showing a configuration example of an analysis system including the centrifugal field-flow fractionation device 1 according to another embodiment of the present invention. The present embodiment is different from the above embodiment only in that a fraction collector 8 is provided downstream of the detector 6, and the other configurations are similar to those of the above embodiment. Accordingly, similar configurations are attached with the same reference numerals in the figure and the detailed description thereof is omitted.

The fraction collector 8 is an apparatus for collecting particles in a liquid sample. By providing the fraction collector 8 downstream of the detector 6, particles in a liquid sample detected by the detector 6 can be collected by the fraction collector 8 without being discarded to the carrier collection unit 7.

The above embodiment describes the configuration in which the channel member 16 is curved in an arc shape after a plurality of layers are joined to form the integral channel member 16. However, the present invention is not limited to such a configuration, and can have a configuration in which a plurality of layers are joined to form the integral channel member 16 after the layers are curved in an arc shape.

Further, the configuration may be such that the fixing member 17 is configured integrally with the channel member 16. That is, the channel 161 may be formed by forming a recess on the outer peripheral surface of the fixing member 17 by machining or etching, and closing an outer side of the fixing member 17 with the outer surface layer 61. Further, the channel 161 may be formed by forming a recess on the inner peripheral surface of the outer surface layer 61 and closing an inner side of the outer surface layer 61 with the fixing member 17.

The channel member 16 is not limited to a configuration in which a plurality of layers are stacked, and may be formed as one member of resin or the like using, for example, blow molding.

DESCRIPTION OF REFERENCE SIGNS

1 centrifugal field-flow fractionation device
2 carrier storage unit
3 liquid feed pump
4 rotary valve
5 sample injection device
6 detector
7 carrier collection unit
8 fraction collector
10 rotation unit
11 rotational shaft
12 introduction unit
13 discharge unit
14 rotor
15 spacer
16 channel member
17 fixing member
18 wedge-shaped member
19 bolt
20 holding table
30 protective wall
40 motor
50 control unit
61 outer surface layer
62 inner surface layer
63 intermediate layer
64 channel layer
65 separation layer
161 channel
162 outer peripheral surface
163 inner peripheral surface
164 inlet
165 outlet
166 insertion hole
167 divided channel
168 small hole
621 recess
622 port portion 631 opening
632 port portion
633 curved portion
641 opening
651 through-hole

The invention claimed is:

1. A manufacturing method of a centrifugal field-flow fractionation device comprising:
a rotor that rotates about a rotation axis and has an annular shape;
a channel member that is provided along an inner peripheral surface of the rotor and has an arc shape, the channel member comprising:
an outer peripheral surface that is provided on a side of the rotor and has an arc shape;
an inner peripheral surface that is provided on a side of the rotation axis and has an arc shape;
a channel for a liquid sample provided inside the channel member;
an inlet for the liquid sample to flows into the channel; and
an outlet for the liquid sample to flows out from the channel; and
a rotation drive unit that rotates the rotor so that particles in the liquid sample in the channel are classified by a centrifugal force,
the manufacturing method comprising forming the channel member by:
joining a plurality of layers to each other by diffusion bonding to form a flat laminate;
curving the flat laminate to form a curved laminate;
disposing the curved laminate along the inner peripheral surface of the rotor,
wherein the channel member defines a hollow member having the channel formed inside,
wherein the outer peripheral surface and the inner peripheral surface are integrally formed to provide the hollow channel member, and
wherein the plurality of layers comprise an outer surface layer on which the outer peripheral surface is formed and an inner surface layer on which the inner peripheral surface is formed.

2. The method of manufacturing the centrifugal field-flow fractionation device according to claim 1, further comprising a fixing member that is provided along the inner peripheral surface of the channel member,
wherein the fixing member is configured to press and fix the channel member to the rotor.

3. The method of manufacturing the centrifugal field-flow fractionation device according to claim 1, wherein the plurality of layers are formed of a same kind of material.

4. The method of manufacturing the centrifugal field-flow fractionation device according to claim 1, wherein the channel has a bending portion or a curved portion that changes a flowing direction of the liquid sample in a plane parallel to the outer peripheral surface and the inner peripheral surface.

5. The method of manufacturing the centrifugal field-flow fractionation device according to claim 1,
wherein the channel member has a plurality of divided channels extending in an arc shape and arranged in a radial direction, wherein the plurality of divided channels are layered and are divided by barriers having openings that connect the plurality of divided channels.

6. The method of manufacturing the centrifugal field-flow fractionation device according to claim 1, wherein
the channel member has a plurality of the channels formed in a same plane parallel to the outer peripheral surface and the inner peripheral surface, and
the inlet and the outlet are formed in a manner corresponding to each of the channels.

* * * * *